(No Model.)
2 Sheets—Sheet 1.

C. H. WILDER.
CARBON BATTERY.

No. 372,734. Patented Nov. 8, 1887.

Witnesses:
Inventor,
Charles H. Wilder (No Model.) 2 Sheets—Sheet 2.
C. H. WILDER.
CARBON BATTERY.
No. 372,734. Patented Nov. 8, 1887.
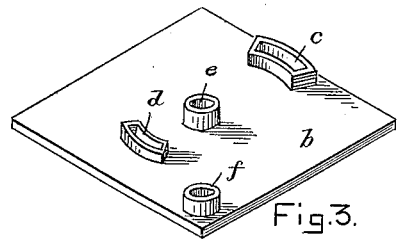
Fig. 3.
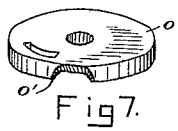
Fig. 7.
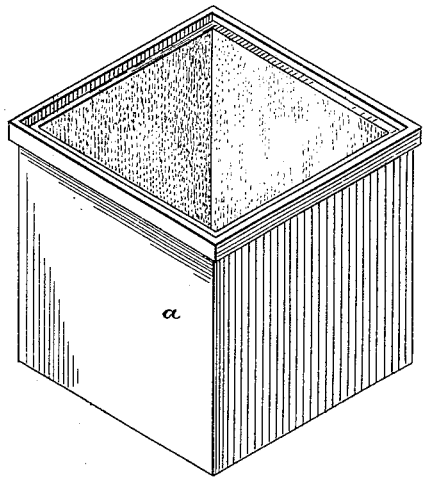
Fig. 4.
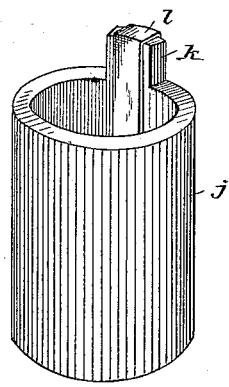
Fig. 8.
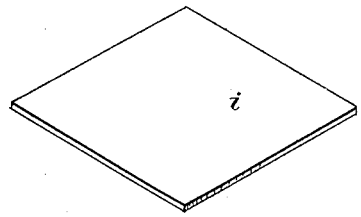
Fig. 5.
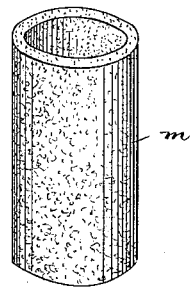
Fig. 9.
Fig. 10.
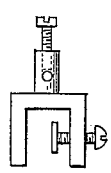
Fig. 6.
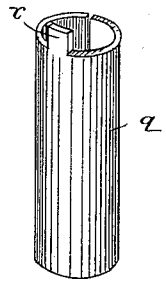
Fig. 11.
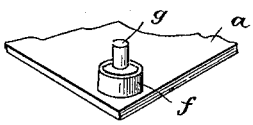
Fig. 12.
Witnesses
Inventor
Charles H. Wilder

UNITED STATES PATENT OFFICE.

CHARLES H. WILDER, OF NATICK, ASSIGNOR TO LUKE A. WILDER, TRUSTEE, OF BOSTON, MASSACHUSETTS.

CARBON BATTERY.

SPECIFICATION forming part of Letters Patent No. 372,734, dated November 8, 1887.

Application filed April 15, 1887. Serial No. 234,972. (No model.)

*To all whom it may concern:*

Be it known that I, CHARLES H. WILDER, of Natick, in the county of Middlesex and Commonwealth of Massachusetts, have invented a new and useful Improvement in Carbon Batteries for Generating Electricity, of which the following is a specification.

The object of the invention is to produce a battery by which a greater current of electricity than has been ordinarily produced by carbon or chemical batteries of similar size can be evolved and at less cost.

The invention consists in certain combinations of parts constituting the cell, as hereinafter set forth and claimed.

Figure 1:
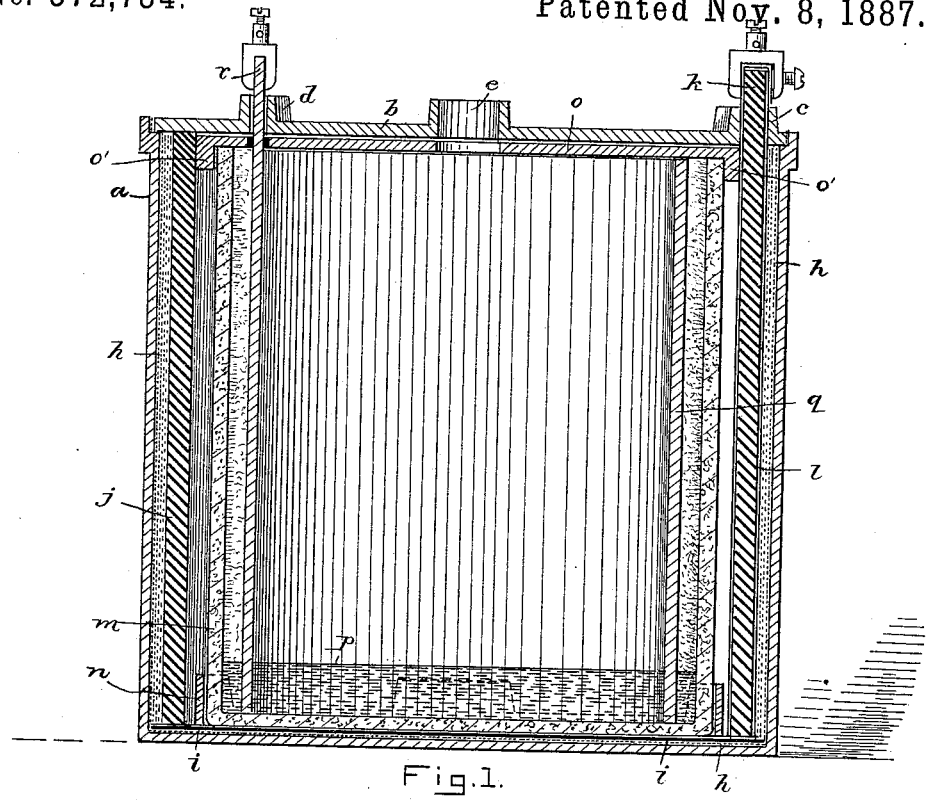
Figure 2:
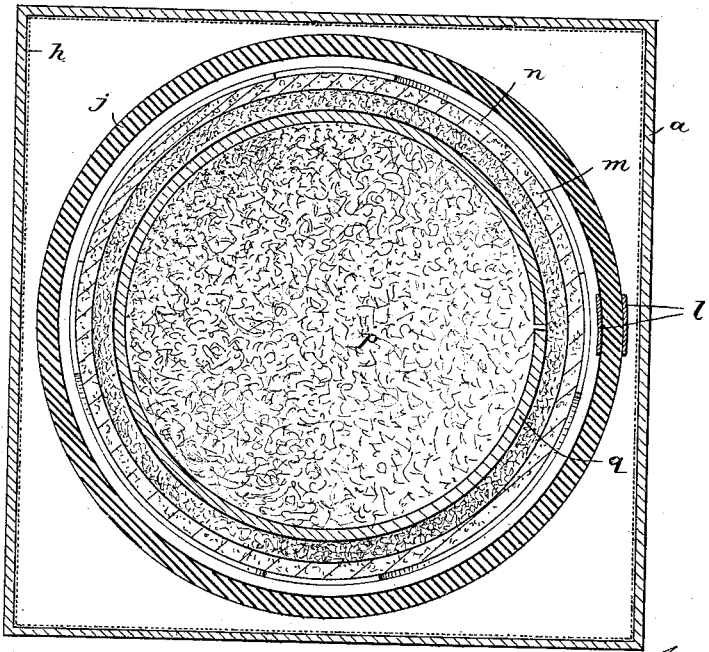

In the drawings annexed, Figure 1 shows a vertical section of an electric cell constructed as described. Fig. 2 shows a transverse section of such a cell. Fig. 3 shows the cover of the inclosing-tank. Fig. 4 shows a perspective of the inclosing-tank without the cover and without the carbon and other parts which it is to contain. Fig. 5 is a perspective view of the piece of sheet-lead which is placed in the bottom of the inclosing-tank. Fig. 6 shows a clamp to connect wires to the top of the posts on the carbon and the post on the zinc. Fig. 7 shows the lead cover for the top of the porous cup, which extends beyond the cup, with a downward-projecting lip which makes contact with the carbon. Fig. 8 shows a perspective of the cylindrical piece of carbon provided with a post on its top edge and with a vertical ribbon of lead. Fig. 9 shows a perspective of the cylindrical porous cup. Fig. 10 shows the guide which is placed on the lead at the bottom of the inclosing-tank, between the carbon and the porous cup, to keep the porous cup in its place. Fig. 11 shows a perspective of the cylindrical piece of zinc provided with a post. Fig. 12 shows a segment of the cover of the inclosing-tank provided with one of the apertures having the vented plug in it.

What I designate as a "cell" is a single inclosing-tank containing the carbon, zinc, porous cup, lead, mercury, and chemical acids used therein, and two or more such cells connected I shall term a "battery."

The inclosing-tank (marked $a$) I prefer to make of iron cast in any desired form, (but any other suitable metal or substance may be used.) About nine inches square is a convenient size for such tanks. The capacity and efficiency of a cell may be augmented by increasing its height. Each tank is provided with a close cover, $b$, which, when secured in place and cemented in, makes it exactly tight, except minute vents to allow escape of generated gases, and secures its contents from waste. There are two apertures through the cover— one (marked $c$) for a post on the carbon and one (marked $d$) for a post on the zinc—and also two apertures—one (marked $e$) for withdrawing spent fluids from the porous cup and one (marked $f$) for withdrawing the fluid from the tank and through which a fresh supply of exciting-fluids may be injected. When the tank is filled, the apertures $e$ and $f$ are securely closed by plugs (marked $g$) made for the purpose, having fine vent-holes, above referred to.

The inside of the tank is provided with a lining, $h$, composed of paraffine, beeswax, rubber, red lead, and litharge, such as that described in my application filed February 17, 1887, Serial No. 228,012. This compound is plastic and somewhat elastic, and is impervious to the strongest acids. The joints of the cover and the tank and the apertures are all cemented with this substance or compound.

In the bottom of the inclosing-tank I place a piece of sheet-lead (marked $i$) about an eighth of an inch thick, covering nearly its whole area. Next I place in it, resting on the lead plate, a piece of carbon (marked $j$.) I make this in form of a hollow cylinder with vertical walls about three-quarters of an inch thick, with a diameter of about three quarters of the inside measure of the tank, and high enough to reach from the lead plate $i$ at the bottom to the level of the top of the tank. On the top edge of this carbon-electrode and integral with it is made a vertically-projecting post (marked $k$) about two inches long. I fold a ribbon of sheet-lead, (marked $l$) about one inch wide, around the vertical wall of the carbon electrode, this ribbon extending over the post on the top edge of the electrode. Within this piece of carbon I place a cup (marked $m$) made of burned clay or other similar porous material, the outside diameter of which is one-half inch less than the inside diameter of the carbon $j$. The bottom of the porous cup $m$ is set in a circular guide (marked $n$) preferably of lead, placed on the lead plate at the bottom of the tank inside of the carbon electrode. This guide keeps the cup from coming in contact with the carbon. The top of the porous cup is secured in its place by the lead cover, which is marked o, and described below. I put a little mercury (marked p) in the bottom of this porous cup, and place a piece of zinc in form of a hollow cylinder, (marked q,) having vertical walls of a diameter about one-half inch less than the diameter of the porous cup, and as high as the walls of the cup, and having on the top edge at one side a vertical post (marked r) integral with the cylinder and about one inch wide, which extends up through the lead covering described below and through the aperture made for it in the cover of the inclosing-tank.

I place a lead cover (marked o) over the top of the porous cup. This cover is fitted to tightly close the porous cup and prevent the escape of fluid therefrom, and it extends beyond the edge of the porous cup horizontally, filling the space between it and the carbon electrode and making contact with the latter. This lead cover is provided with a downward-projecting flange, o', which comes between the porous cup and the carbon electrode and serves to hold the former out of contact with the latter.

The lead plate in the bottom of the inclosing-tank, the lead guide for the bottom of the porous cup, the lead ribbon folded vertically around the wall of the carbon, and the lead cover for the porous cup, all in contact with the carbon electrode, act together as a conducting medium and serve to increase the electrical effect.

The porous cup I fill with a mixture of sulphuric acid and water, generally about one of the acid to about fifteen in bulk of water; but these proportions may be varied to a considerable extent. I then secure the lead cover to the top of the porous cup. The aperture through the lead cover for the post on the zinc electrode will be a little larger than the post, to prevent contact of the post and the lead cover. I fill the space between the walls of the inclosing-tank and the porous cup with what is known as a "polarizing solution," which may be of a mixture of sulphuric acid, bichromate of potash, or other suitable fluid acids, which permeate the walls of the carbon and fill the space between it and the porous cup. I next secure the cover of the inclosing-tank in its place in the top of the tank against the upper side of the lead cover of the porous cup, and cement it with the same compound used to line the tank. I also cement the aperture through which the posts on the carbon and on the zinc project with the same compound, and thus make them fluid-tight. The cell is thus complete and galvanic action begins. Wires attached to the tops of the posts on the carbon and on the zinc conduct the electricity generated to any desired point for use.

The cylindrical piece of carbon is porous, so that the acid will permeate every part of it, while at the same time it has strength to sustain any ordinary rough usage and is of unlimited durability.

In a cell made as described the zinc will last from six to nine months, more or less, and the carbon for years.

The fluid acids in the porous cup will need renewal or replenishing once in thirty to forty days, and in the tank once in about three to five months.

I claim as my invention—

1. A battery-cell consisting of an inclosing-tank, a hollow carbon electrode within the tank provided with a post on its top edge, a clay cup within the carbon electrode with mercury in the bottom of it, a zinc electrode with a post on its top edge within the clay cup, with its lower edge in the mercury, and suitable exciting-fluids, in combination with a metallic plate in the bottom of the tank, a metallic cover for the clay cup extending over the edge all around to the wall of the carbon electrode and having a downward-projecting lip between the clay cup and the carbon to secure the relative position of both, and a metal strip on the carbon electrode extending from the metallic plate at the bottom of the tank up the side of the electrode and over its post, substantially as described.

2. In a battery-cell, the combination of a tank, a hollow carbon electrode therein, a porous cup within the carbon electrode, a metallic cover closing the porous cup and in contact with the carbon electrode, and a zinc electrode, substantially as described.

3. In a battery-cell, the combination of a hollow carbon electrode, a metallic plate or cover at the top thereof, a metallic plate at the bottom thereof, and a metallic strip on the carbon electrode in contact with said plates, substantially as described.

4. In a battery-cell, the combination of a hollow carbon electrode provided with a post, a metallic plate or cover at the top thereof, a metallic plate at the bottom thereof, and a metallic vertical strip on the carbon electrode, said strip being in contact with the bottom plate and passing over the post on the carbon electrode, substantially as described.

5. In a battery-cell, the combination of a tank, a metallic plate in the bottom of the tank, a hollow carbon electrode resting on said plate, a porous cup within said carbon electrode, a metal ring or guide between said porous cup and electrode, a metal cover for said cup having a flange projecting downward between the porous cup and carbon electrode and in contact with the latter, a zinc electrode, suitable exciting-fluids, and electric connections, substantially as described.

CHARLES H. WILDER.

Witnesses:
CHS. HOUGHTON,
G. B. WILCOX.